(12) United States Patent
Kawamura et al.

(10) Patent No.: US 8,015,704 B2
(45) Date of Patent: Sep. 13, 2011

(54) METHOD AND DEVICE FOR REMOVING CHIP OF CONNECTING ROD

(75) Inventors: Masaki Kawamura, Mooka (JP); Hideki Okumura, Koga (JP)

(73) Assignee: Honda Motor Co., Ltd., Tokyo (JP)

( * ) Notice: Subject to any disclaimer, the term of this patent is extended or adjusted under 35 U.S.C. 154(b) by 1150 days.

(21) Appl. No.: 11/667,066

(22) PCT Filed: Nov. 25, 2005

(86) PCT No.: PCT/JP2005/021731
§ 371 (c)(1),
(2), (4) Date: May 4, 2007

(87) PCT Pub. No.: WO2006/057362
PCT Pub. Date: Jun. 1, 2006

(65) Prior Publication Data
US 2008/0209708 A1    Sep. 4, 2008

(30) Foreign Application Priority Data
Nov. 25, 2004    (JP) ................................ 2004-340964

(51) Int. Cl.
*B21D 53/84* (2006.01)
(52) U.S. Cl. ................. 29/888.09; 29/416; 29/DIG. 46; 29/821
(58) Field of Classification Search ............... 29/402.01, 29/888.09, 888.091, 416, DIG. 46, 821
See application file for complete search history.

(56) References Cited

U.S. PATENT DOCUMENTS

| | | | |
|---|---|---|---|
| 6,427,326 B1 | 8/2002 | Soga et al. | |
| 6,671,955 B2 * | 1/2004 | Hugler | 29/888.09 |
| 7,143,915 B2 * | 12/2006 | Guirgis | 225/2 |
| 7,146,677 B2 * | 12/2006 | Litomisky et al. | 15/301 |
| 7,658,003 B2 * | 2/2010 | Hase | 29/888.09 |
| 2002/0162205 A1 | 11/2002 | Hugler | |

FOREIGN PATENT DOCUMENTS

| | | |
|---|---|---|
| DE | 10161817 A1 | 3/2003 |
| JP | 5-12059 U | 2/1993 |
| JP | 11-182615 A | 7/1999 |
| JP | 2001-3924 A | 1/2001 |
| JP | 2001-62665 A | 3/2001 |
| JP | 2003-512522 A | 4/2003 |
| JP | 2003-181739 A | 7/2003 |

* cited by examiner

*Primary Examiner* — Rick K Chang
(74) *Attorney, Agent, or Firm* — Birch, Stewart, Kolasch & Birch, LLP

(57) ABSTRACT

A method and a device for removing the chips of a connecting rod. The large end part of the connecting rod is placed on the step part of a pedestal, and the small end part thereof is placed on a pedestal formed of a vibration damping material. An air vibrator is energized to continuously supply compressed air to vibrate the large end part together with the pedestal until the vibrated large end part is brought into contact with a contact plate member. When chips fall from the rod body and the cap part of the connecting rod, the chips are collected to a transparent collection bag through a suction hose by a dust collector. The operations above are performed in a sound isolation box closed by a cover member. Then, the chips are separated from the broken-out sections of the rod body and the cap part by using, for example, a brush.

15 Claims, 11 Drawing Sheets

METHOD AND DEVICE FOR REMOVING CHIP OF CONNECTING ROD

TECHNICAL FIELD

The present invention relates to a method of removing a fragment or chip from a connecting rod formed by combining a rod body and a cap that have been fractured, as well as to an apparatus (device) for performing the method.

BACKGROUND ART

A connecting rod (hereinafter referred to also as a conrod) 1, as shown in FIG. 9, acts to connect a piston and a crankshaft in an internal combustion engine, and to convert reciprocating up-and-down movements of the piston into the rotational driving force of the crankshaft.

In the conrod 1, a first through hole 3 is formed in one end of a long shank 2, and a second through hole 4, having a diameter larger than that of the first through hole 3, is formed in the other end. In general, the one end having the first through hole 3 is referred to as a smaller end 5, and the other end having the second through hole 4, which is wider than the smaller end 5, is referred to as a larger end 6.

This kind of conrod 1 is produced, for example, in such a manner that a single-piece rod having a rod body 7 and a cap 8 is integrally formed by forging (see FIG. 10). The larger end 6 is split into the rod body 7 and the cap 8 at notches C formed approximately at the center of the second through hole 4 (see FIG. 9), and the rod body 7 and the cap 8 are coupled by inserting bolts (not shown) into bolt holes 9.

As shown in FIGS. 11A to 11C, a major crack 100 is extended by means of a brittle fracture, whereby the split at the notchesC proceeds. In the case that fine minor cracks 102 are generated due to branching from the major crack 100 during extending, such minor cracks 102 often grow when the conrod 1 is attached to an internal combustion engine or when the engine is driven. In some cases, the minor cracks 102 extend and become connected to each other, and as a result, a portion where the rod body 7 and the cap 8 are substantially not in contact is formed, as shown by reference numeral 104 in FIG. 11B.

The portion 104 is brittle, and thus there is a fear that when mechanical stresses are applied to the portion 104 by screwing the bolts, the portion 104 may become dropped as a fragment, as shown in FIG. 11C.

The generation of such a fragment causes problems in that the dropped fragment becomes inserted between the conrod 1 and the crankshaft, thereby reducing assembling accuracy, or the fragment may become mixed in with the engine oil, tending to deteriorate the oil rapidly. Thus, subsequent processes must tightly be managed, whereby the fragment is dropped and removed before commencing screwing of the bolts.

For example, a method is proposed in Patent Document 1 containing the steps of causing reciprocatory movement between a cap by a cylinder, thereby bringing the cap into slight contact with the cracked surface of a rod body, so as to remove particles, and then blowing off the removed particles by airflow from a nozzle.

Further, in Patent Document 2, the applicant has proposed a method of brushing the cracked surface.
Patent Document 1: Japanese Laid-Open Patent Publication No. 2003-512522 (PCT Application)
Patent Document 2: Japanese Laid-Open Patent Publication No. 2001-3924

DISCLOSURE OF THE INVENTION

A general object of the present invention is to provide a fragment removing method for efficiently removing a fragment from a cracked surface of a connecting rod.

Another object of the present invention is to provide a fragment removing apparatus for efficiently removing the fragment.

A further object of the present invention is to provide a fragment removing apparatus that allows the observation of fragment removal from a cracked surface.

A still further object of the present invention is to provide a fragment removing apparatus, which improves the working environment.

According to an aspect of the present invention, there is provided a method of removing a fragment from a connecting rod obtained by forming a one-piece rod containing a shank, a smaller end provided at one end of the shank and having a first through hole, and a larger end wider than the smaller end provided at another end of the shank and having a second through hole larger than the first through hole, and cracking the larger end to form a rod body and a cap, the method comprising the steps of:

positioning the cracked connecting rod with a holder, while leaving a clearance between the rod body and the cap; and vibrating the holder, thereby vibrating only the larger end to cause a fragment to drop from the larger end.

In the present invention, the larger end, i.e., the portions around the second through hole in the rod body and the cap can be vibrated simultaneously, thereby resulting in remarkably improved fragment removing efficiency. Thus, fragments do not become inserted between the rod body and the cap, or between the conrod and a crankshaft, so that the connection accuracy of the rod body and cap, as well as the assembling accuracy of the conrod and crankshaft, can be improved. Further, fragments do not become mixed with the engine oil, so that the engine oil does not deteriorate rapidly.

A further process of eliminating a fragment from the cracked surfaces may be carried out after the above vibrating step. Thus, according to another aspect of the present invention, there is provided a method of removing a fragment from a connecting rod obtained by forming a one-piece rod containing a shank, a smaller end provided at one end of the shank and having a first through hole, and a larger end wider than the smaller end provided at another end of the shank and having a second through hole larger than the first through hole, and cracking the larger end to form a rod body and a cap, the method comprising the steps of:

positioning the cracked connecting rod with a holder, while leaving a clearance between the rod body and the cap;

vibrating the holder, thereby vibrating only the larger end to cause a fragment to drop from the larger end; and further eliminating a fragment from the cracked surfaces of the rod body and the cap, by a fragment eliminating means.

By carrying out the above eliminating step, a larger number of fragments can be removed from the cracked surfaces before bolting is performed. Thus, the connection accuracy of the rod body and cap, and assembling accuracy of the conrod and crankshaft, can be further improved. Further, the engine oil does not become deteriorated over a longer period.

In both aspects, the step of further eliminating a fragment from cracked surfaces of the rod body and the cap by using the fragment eliminating means may be carried out before the vibrating step. In this case, fragments can be more reliably removed from the cracked surfaces.

Preferred examples of the fragment eliminating means include brushes, adhesive tapes, and aspirators. In the case of using a brush, the cracked surfaces are brushed. In the case of using an adhesive tape, the adhesive tape is applied to the cracked surfaces in order to bond fragments onto the tape. In the case of using an aspirator, fragments are eliminated from the cracked surfaces under aspiration. In all cases, fragments are eliminated and removed from the cracked surfaces.

In the present invention, it is preferred that a larger end-receiving member be disposed above the larger end, wherein the vibrated larger end comes into contact with the end-receiving member. In this case, fragments can more reliably be removed by such contact.

Preferred examples of the vibrating means for vibrating the holder and thereby vibrating the larger end placed thereon include a means using a compressed gas. In this case, the larger end can be vibrated using an apparatus that has a simple structure.

According to a further aspect of the present invention, there is provided an apparatus for removing a fragment from a connecting rod containing a shank, a smaller end provided at one end of the shank and having a first through hole, and a larger end wider than the smaller end provided at another end of the shank and having a second through hole larger than the first through hole, the larger end being cracked to form a rod body and a cap, the apparatus comprising:

a mount;

a holder fixed onto the mount for positioning the cracked connecting rod;

a vibration isolating leg member for supporting the mount; and a vibrating means fixed onto the mount for vibrating the holder.

By using the apparatus having such a structure, only the larger end can be vibrated without imparting vibration to the smaller end, whereby fragments can be efficiently removed from the larger end (the rod body and the cap).

Preferably, the apparatus has a larger end-receiving member, which the vibrated larger end can come into contact with, and hence, fragments can more reliably be removed by such contact.

The larger end-receiving member is preferably rotatable. In this case, the larger end can easily be placed on the mount by turning the larger end-receiving member.

As described above, preferred examples of the vibrating means include a means using a compressed gas. In this case, the apparatus can have a simple structure. Further, by using such an apparatus, there is no fear that impurities will become inserted between the rod body and the cap.

It is preferred that the apparatus has a fragment-collecting unit for collecting dropped fragments. In this case, the collection of fragments is observed in order to confirm the removal of fragments from the larger end.

Preferably, the apparatus is contained inside of a casing. When the fragment removing process is carried out with the casing closed, noises produced during the fragment removing process can be blocked, resulting in an excellent working environment.

BEST MODE FOR CARRYING OUT THE INVENTION

A preferred embodiment of the fragment removing method according to the present invention shall be described in detail below, with reference to the accompanying drawings, in relation to an apparatus used for performing the method.

Figure 1:
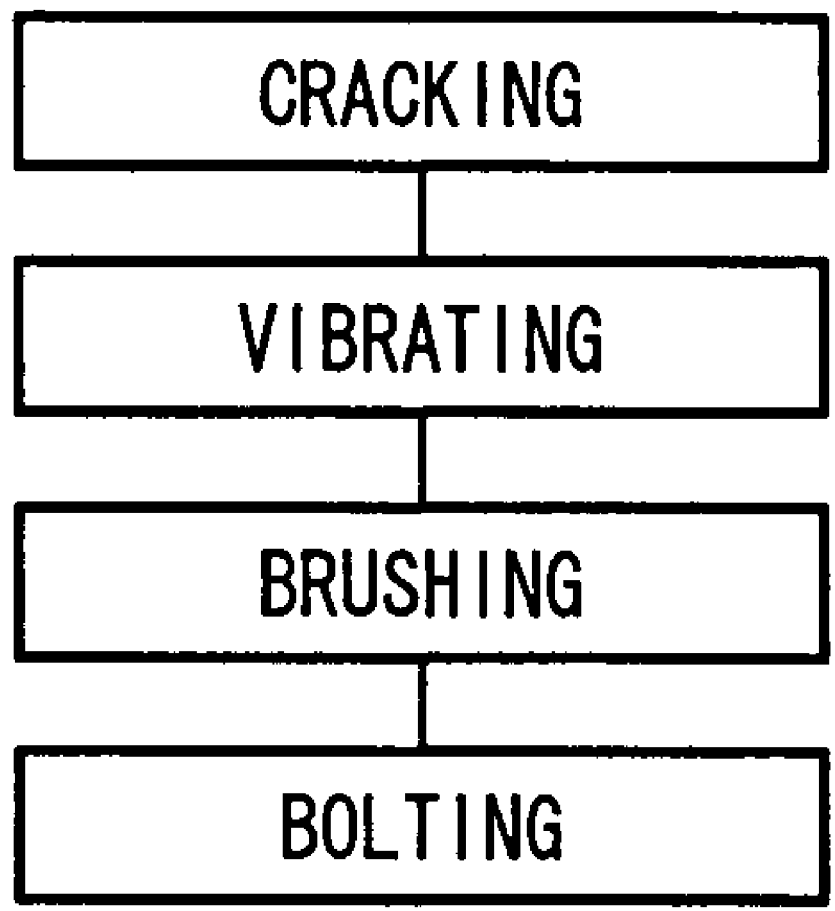
FIG. 1 is a flowchart of a fragment removing method according to an embodiment of the present invention.
Figure 9:
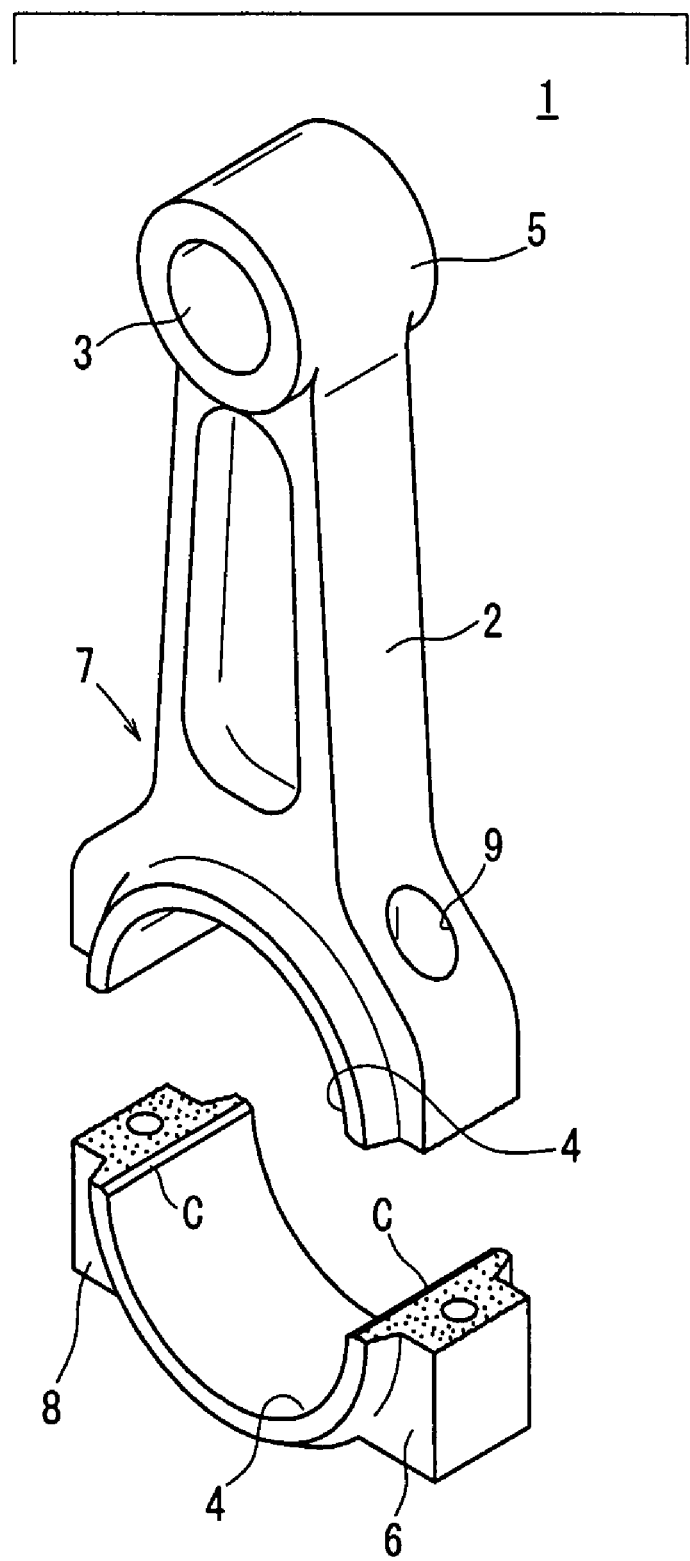
FIG. 9 is a schematic, overall perspective view showing a conrod after cracking.

A flowchart of the fragment removing method according to this embodiment is shown in FIG. 1. In the fragment removing method, first, a one-piece conrod 1 is cracked (see FIGS. 9 and 10) and then vibrated. The cracked surfaces are brushed, and bolts are screwed into bolt holes 9. Thus, in this embodiment, a brush is used as the fragment eliminating means.

Figure 10:
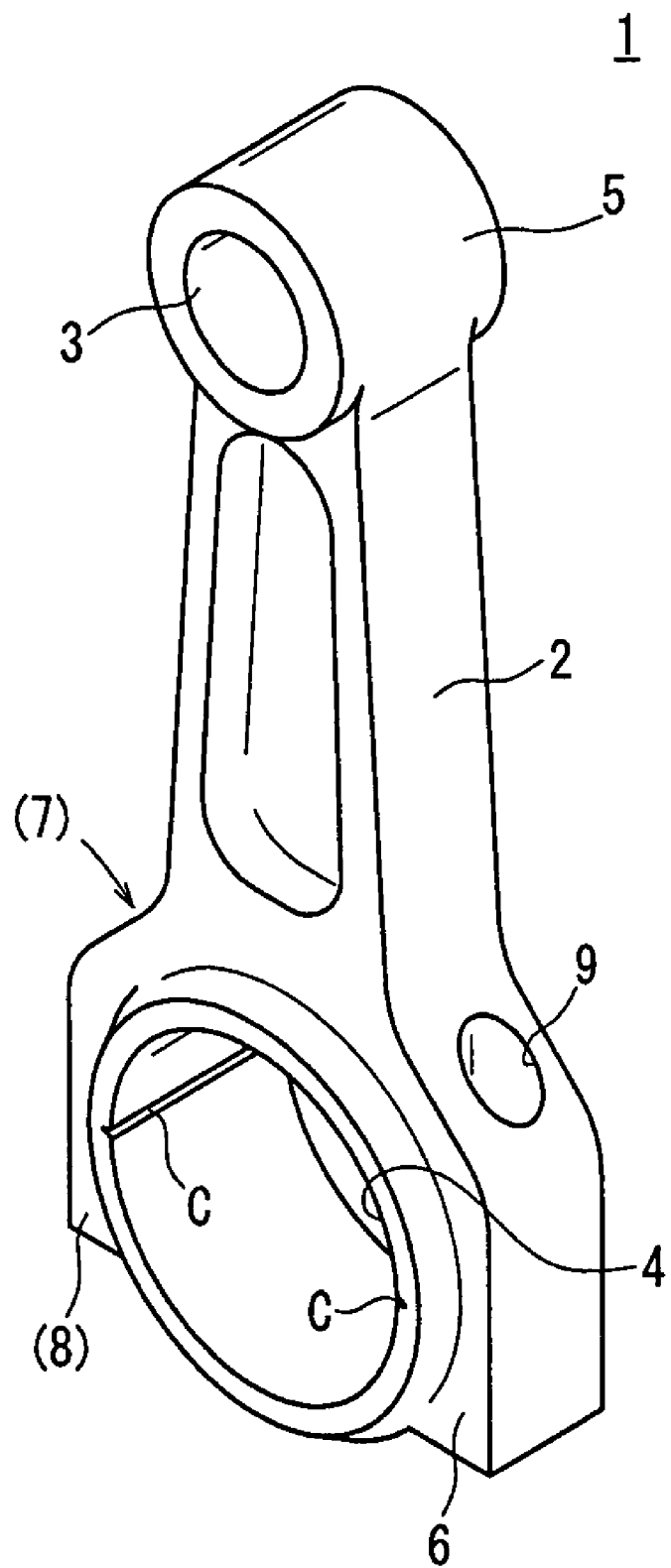
FIG. 10 is a schematic, overall perspective view showing a conrod before cracking.
Figure 11A:
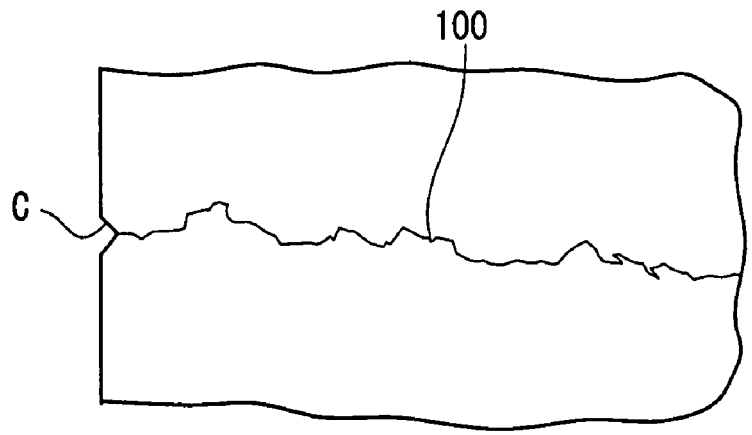
FIGS. 11A to 11C are partially enlarged views showing minor cracks, which are generated due to extension from a major crack in cracked surfaces, and which are connected to each other to form a fragment that is dropped.
Figure 11B:
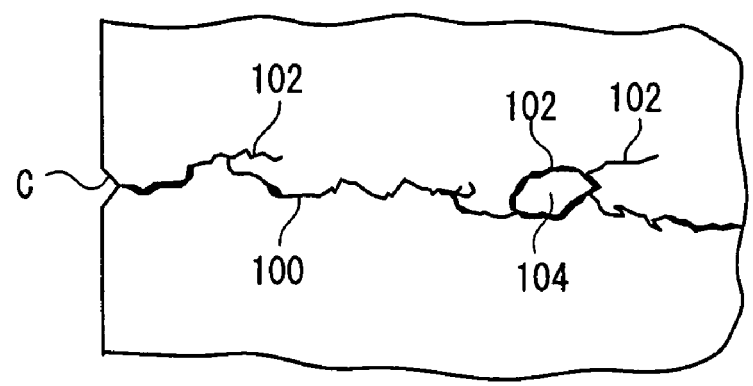
Figure 11C:
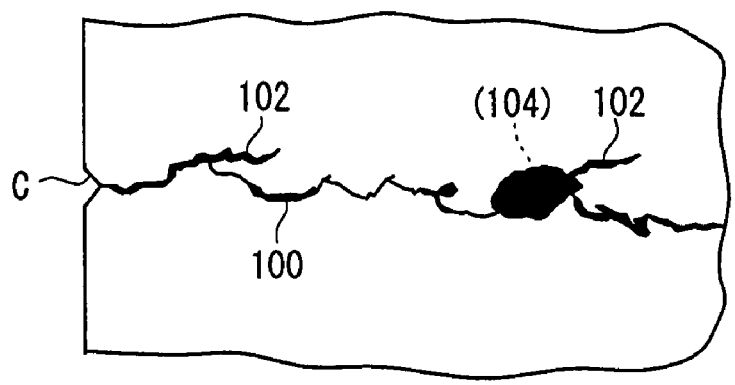

Thus, the one-piece conrod 1 having a smaller end 5, a shank 2, and a larger end 6 is integrally formed by forging (see FIG. 10). The larger end 6 is cracked substantially at the center of a second through hole 4 by a cracking apparatus, such as the apparatus shown in FIG. 2 of Patent Document 2 or the like, to thereby form a rod body 7 and a cap 8 (see FIG. 9).

Figure 2:
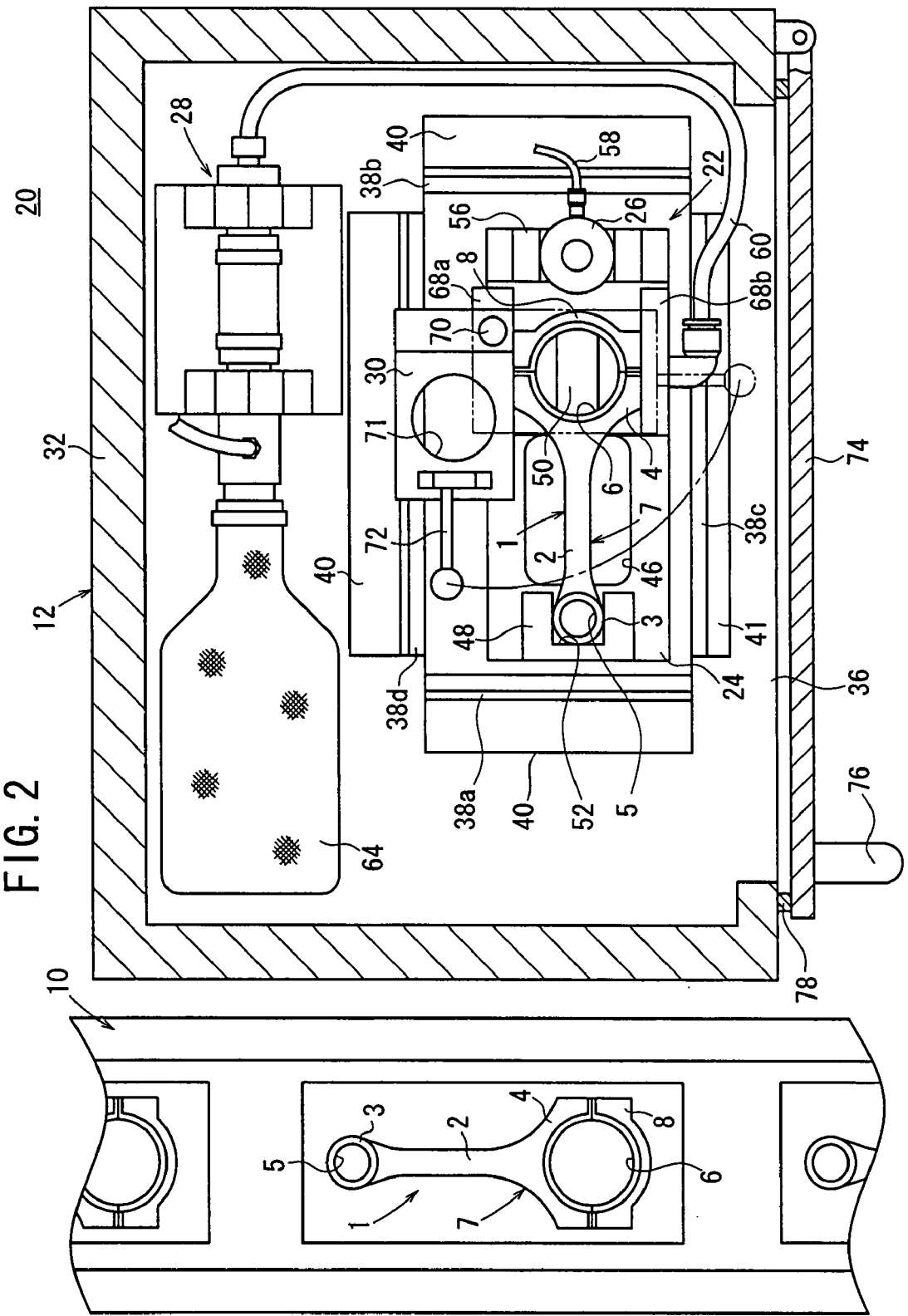
FIG. 2 is a plan view showing a production line and a fragment removing apparatus according to the embodiment.

The rod body 7 and the cap 8, split in this manner, are temporarily connected by screwing bolts into the bolt holes 9, and the rod body 7 and cap 8 are conveyed along the production line 10 shown in FIG. 2 to a station 12. In the station 12, the rod body 7 and the cap 8 are transported by a robot (not shown) to a fragment removing apparatus 20 according to the present embodiment, whereupon fragments are removed from the larger end 6 (made up of the rod body 7 and the cap 8). The production line 10 is a line for assembling an internal combustion engine, wherein the conrod 1 is to be attached to a crankshaft or the like by fully bolting the conrod 1 after fragments have been removed therefrom.

Figure 3:
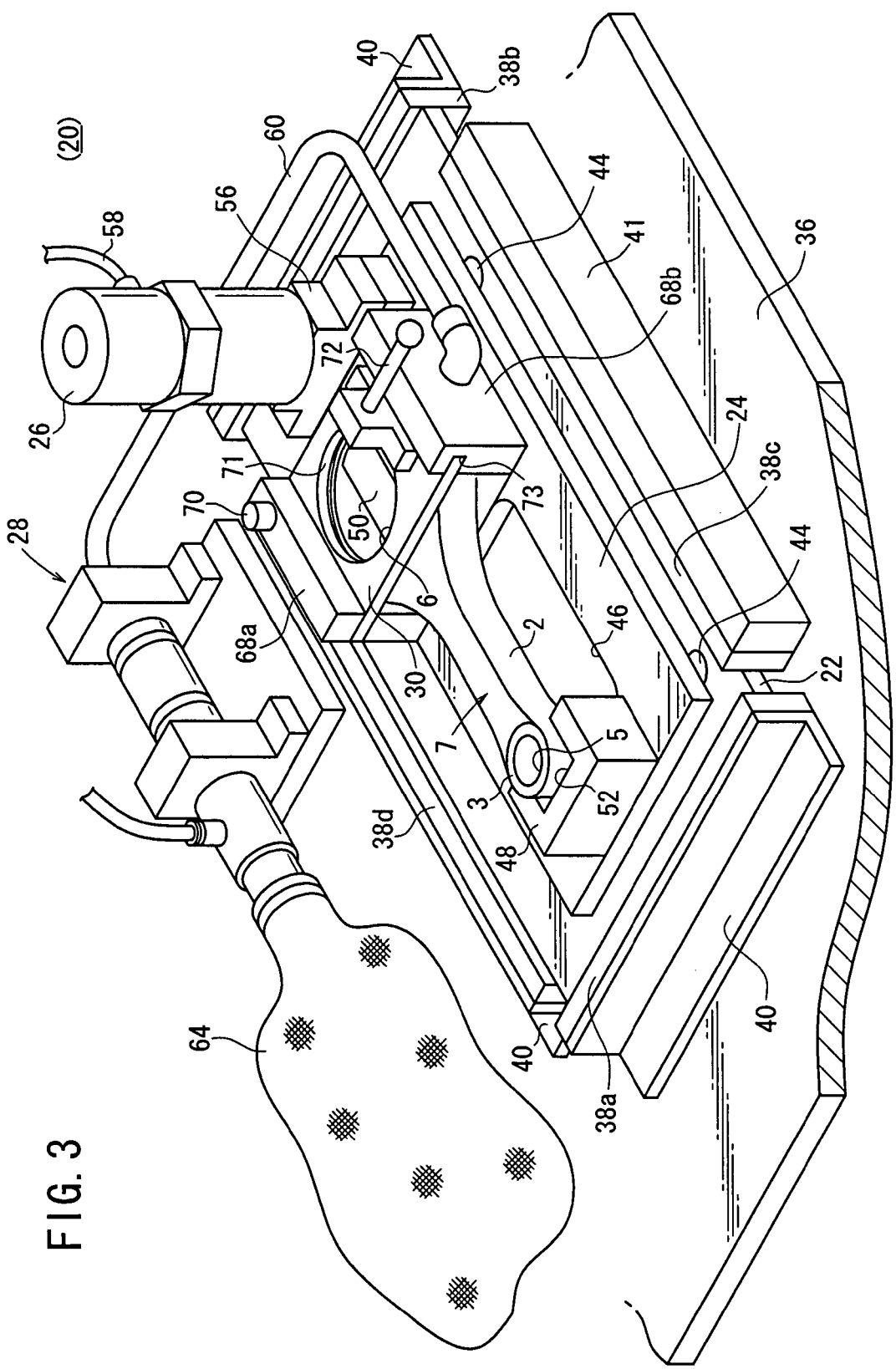
FIG. 3 is a schematic, perspective view showing a main section of the fragment removing apparatus of FIG. 2.

FIG. 2 is a plan view of the fragment removing apparatus 20, whereas FIG. 3 is a schematic, overall perspective view thereof. In FIGS. 2 and 3, the rod body 7 and the cap 8 are placed on the fragment removing apparatus 20.

The fragment removing apparatus 20 includes a support 22, a mount 24 placed on the support 22, an air vibrator 26 used as a vibrating means and utilizing compressed air for vibrating the mount 24, a dust collector 28 used as a fragment-collecting unit for collecting dropped fragments, a contact plate 30 used as a larger end receiving member, which is rotatable from a position at which the larger end 6 is covered by the plate to a position at which the larger end 6 is exposed, and a sound insulating box 32 serving as a casing for containing the apparatus components (see FIG. 2).

Figure 4:
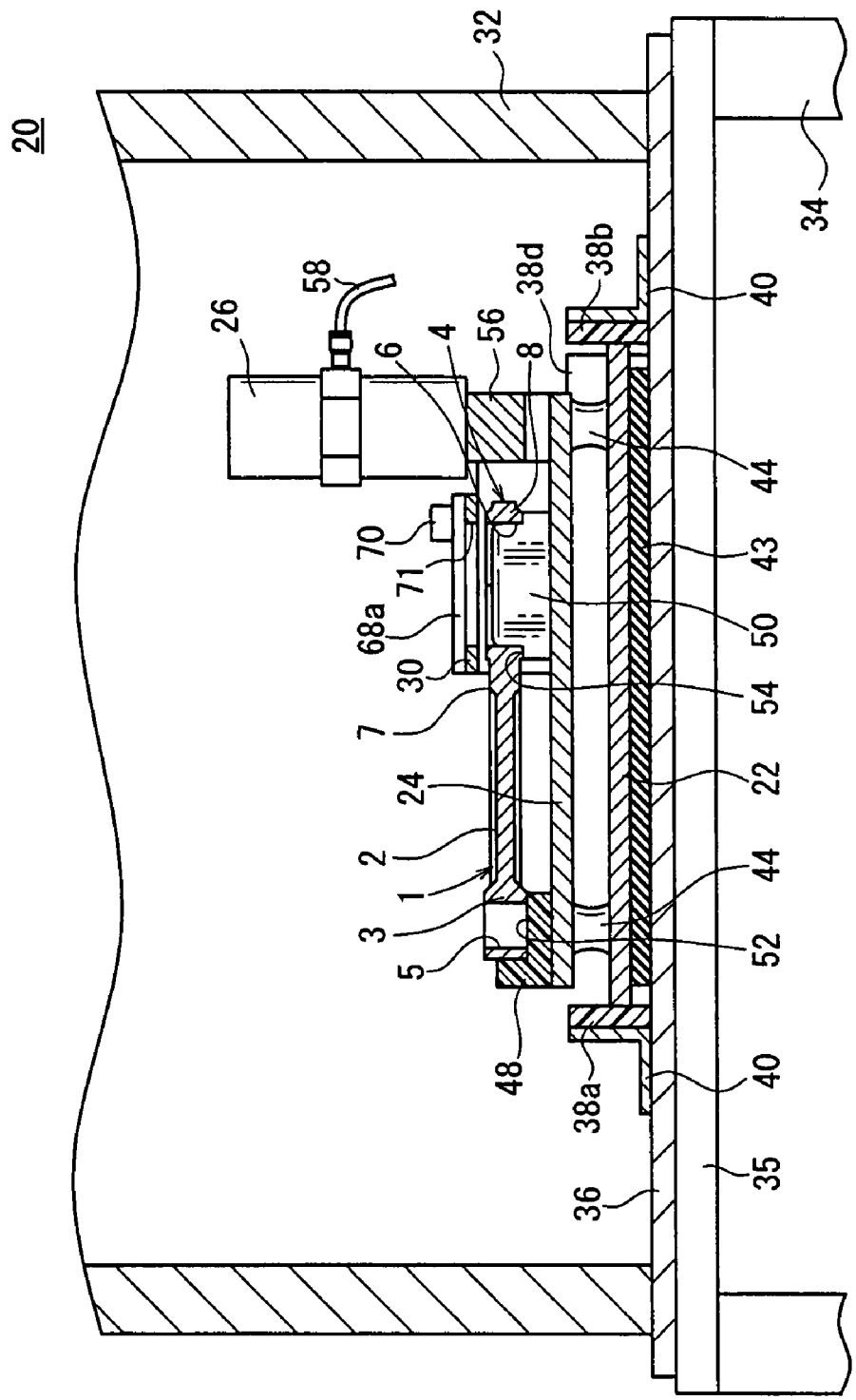
FIG. 4 is a partial, vertical sectional front view showing the fragment removing apparatus of FIG. 2.

As shown in FIG. 4, the support 22 is bonded onto an apparatus base plate 36, which is placed on a ceiling board 35 on legs 34. Specifically, side surfaces of the support 22 are fixed to long connecting plates 38a to 38d respectively, and the connecting plates 38a to 38d are fixed to the apparatus base plate 36 by means of L-shaped stays 40 and stays 41. In other words, the support 22 is suspended between the connecting plates 38a to 38d. A sheet-shaped vibration isolating member 43, made of rubber or the like, is disposed between the apparatus base plate 36 and the support 22. The vibration isolating member 43 may be a commercially available vibration isolating sheet.

Vibration isolating leg members, formed of insulators 44, are disposed around four corners on a lower surface of the mount 24 that is positioned above the support 22 (see FIGS. 3 and 4), and the mount 24 is attached to the upper surface of the support 22 by the insulators 44. The insulators 44 may be composed of ANTIVIBRATION GELS (trade name) or the like.

A rectangular hole 46 is formed at the center of the mount 24 in order to reduce its weight (see FIGS. 2 and 3), and a vibration isolating holder 48 and another holder 50 are arranged in sandwiching relation to the rectangular hole 46.

In this case, the vibration isolating holder 48 is composed of urethane foam, silicone rubber, or the like, having an approximately C-shaped form with a recess 52. The smaller end 5 is inserted into the recess 52 and thereby placed within the vibration isolating holder 48, as described below.

On the other hand, the holder 50 has a cylindrical shape, with peripheral sidewalls cut off to form steps 54 on a top part thereof. The larger end 6 is placed on the steps 54 as described below, while the inner walls of the split second through hole 4 are placed in contact with the remaining peripheral sidewalls, at the top part. Thus, the inner wall of the second through hole 4 that is formed in the rod body 7 comes into contact with the remaining peripheral sidewall facing the vibration isolating holder 48, and the inner wall of the second through hole 4 of the cap 8 comes into contact with the remaining peripheral sidewall facing the air vibrator 26. During this step, for example, a clearance of about 5 mm is formed between the rod body 7 and the cap 8.

The air vibrator 26 is vertically positioned and fixed by a bolt (not shown) onto a bracket 56 that is connected to the mount 24. A piston (not shown) is inserted into the air vibrator 26, and is reciprocally moved up and down by supplying compressed air through an air hose 58, in order to vibrate the air vibrator 26. An end of the air hose 58 is connected to a compressed air supply (not shown).

A suction hose 60 is connected to the mount 24. As shown in FIGS. 2 and 3, the suction hose 60 is connected to a dust collector 28. The dust collector 28 has a collecting bag 64 for holding dropped fragments. In the present embodiment, the collecting bag 64 is transparent, so that the contents thereof can visually be observed.

Pillar members 68a, 68b surrounding the larger end 6 are vertically disposed on the mount 24 together with the air vibrator 26 (see FIG. 3). The contact plate 30 is rotatably connected to the pillar member 68a by a pin 70. The contact plate 30 has a circular hole 71 therein to reduce its weight, and further has a handling bar 72 fixed to an end thereof. Further, the pillar member 68b has a slot 73 cut therein.

The sound insulating box 32, housing the fragment removing apparatus 20 and the dust collector 28 having the above structures, has an openable and closable cover 74. In FIG. 2, reference numeral 76 represents a bar that the operator holds in order to open or close the cover 74, and reference numeral 78 represents a locking mechanism for positioning and fixing the cover in a closed position.

The fragment removing apparatus 20 according to this embodiment is basically constructed as described above. Operations of the apparatus for carrying out the fragment removing method of the present invention shall be described below.

In the fragment removing method according to the present embodiment, first, the rod body 7 and the cap 8 are taken from the production line 10 shown in FIG. 2. In the station 12, the smaller end 5 is placed on the vibration isolating holder 48, and the larger end 6 is placed on the steps 54 of the holder 50. During this step, the smaller end 5 is positioned such that it becomes inserted into the approximately C-shaped recess 52 of the vibration isolating holder 48.

On the other hand, in the larger end 6, the inner wall of the second through hole 4 of the rod body 7, and the inner wall of the cap 8, are brought respectively into contact with the peripheral sidewalls of the holder 50. As described above, a clearance of about 5 mm is formed between the rod body 7 and the cap 8.

Then, the operator holds the handling bar 72 of the contact plate 30, and rotates the plate around the pin 70. Thus, the contact plate 30 is positioned above the larger end 6, as shown by a two-dot chain line in FIG. 2. The distance between the contact plate 30 and the larger end 6 may be about 0.5 to 1 mm. During this step, the circular hole 71 is located directly above the second through hole 4. An end of the rotated contact plate 30 is inserted into the cut slot 73 of the pillar member 68b (see FIG. 3).

Then, the operator holds the bar 76 and closes the cover 74 of the sound insulating box 32. The cover 74 is positioned and fixed in a closed position by the locking mechanism 78.

Then, compressed air is continuously applied from the air hose 58 to the air vibrator 26 by the compressed air supply (not shown). The piston in the air vibrator 26 is moved in a reciprocating manner by the supplied compressed air, whereby the air vibrator 26 is vibrated. Thus, the bracket 56 and the mount 24 connected thereto are vibrated, and finally the holder 50 on the mount 24 is also vibrated.

When the holder 50 is vibrated, the larger end 6 placed on the holder 50 also is vibrated. At the same time, the larger end 6 comes into contact with the contact plate 30 located thereabove. In the case that minor cracks are generated around the notches C of the rod body 7 and the cap 8, such minor cracks extend and connect with each other as a result of such vibration and contact with the contact place, so that the portions become remarkably poorer in strength and drop from the larger end 6 as fragments. During this step, because the smaller end 5 is placed on the vibration isolating holder 48, vibration of the smaller end 5 is suppressed. Thus, according to the present embodiment, only the larger end 6 is vibrated. Further, vibration of the mount 24 is prevented from being transferred to the support 22 because insulators 44 (vibration isolating leg members) are provided between the support 22 and the mount 24.

For example, the blowing pressure of the compressed air may be 0.2 MPa, and the vibration time of the mount 24 may be 5 seconds, respectively.

When a fragment is dropped from the rod body 7 or the cap 8, the fragment falls onto the support 22 and is collected in the collecting bag 64 by the dust collector 28, which has been actuated beforehand.

As described above, in the present embodiment, fragments are dropped from the larger end 6 by vibrating the larger end 6. Therefore, such fragments can be removed simultaneously from the rod body 7 and the cap 8 in a short period of time, resulting in greatly improved working efficiency.

In the present embodiment, because fragments are collected in the collecting bag 64, after-treatment operations can easily be carried out. Further, removal of the fragments from the rod body 7 and cap 8 can reliably and easily be confirmed simply by observing the collection of fragments in the collecting bag 64. With a transparent collecting bag 64 as described above, the collected fragments in the collecting bag 64 can be visually observed easily.

The above processes are carried out in the sound insulating box 32, with the cover 74 closed as described above. Thus noises, such as vibration noises of the air vibrator 26 and contact noises of the larger end 6 and the contact plate 30, are significantly reduced, thereby resulting in an excellent working environment.

Following the vibrating step, the conrod 1 is transported to a brushing apparatus (not shown). In the brushing apparatus, the cracked surfaces of the rod body 7 and cap 8 are brushed. Thus, fragments can more reliably be removed from the cracked surfaces.

The conrod 1, from which fragments have been removed, is returned to the production line 10 and conveyed to the next station, whereupon the rod body 7 and the cap 8 are connected by bolts. During this step, because a fragment does not become inserted between the rod body 7 and the cap 8, relative positional errors of the rod body 7 and the cap 8 are reduced, and hence connection accuracy is improved.

The conrod 1 finally is attached to an internal combustion engine. Also, during this step, because a fragment does not become inserted between the conrod 1 and the crankshaft, the accuracy of assembly is not deteriorated. In addition, because fragments do not become mixed in the engine oil, the engine oil can be prevented from deteriorating rapidly.

Thus, in the present embodiment, by removing fragments, connection accuracy of the rod body 7 and the cap 8, and assembling accuracy of the conrod 1 on the internal combustion engine, can be improved. Further, rapid deterioration of the engine oil can be prevented.

Although in the above embodiment, an air vibrator 26 is used as the vibrating means, the vibrating means is not limited thereto. The vibrating means may also be comprised of an ultrasonic vibrator or the like.

Although in the above embodiment the suction hose 60 is connected to one side surface of the mount 24, another suction hose 60 may also be connected to the other side surface, opposite to the one side surface.

Further, the clearance between the rod body 7 and the cap 8, the distance between the larger end 6 and the contact plate 30, the blowing pressure of the compressed air, and the time for which the mount 24 is vibrated, are not limited to the values described above, but may be changed appropriately depending on the size and weight of the conrod 1, etc.

Furthermore, removal of fragments may be carried out at a location away the line for assembling the internal combustion engine. For example, fragment removal may be carried out immediately after cracking the conrod 1 into the rod body 7 and the cap 8, or after temporary connection of the rod body 7 and cap 8 and before conveyance thereof to the production line 10. It is apparent that removal of fragments may also be carried out multiple times.

Figure 5:
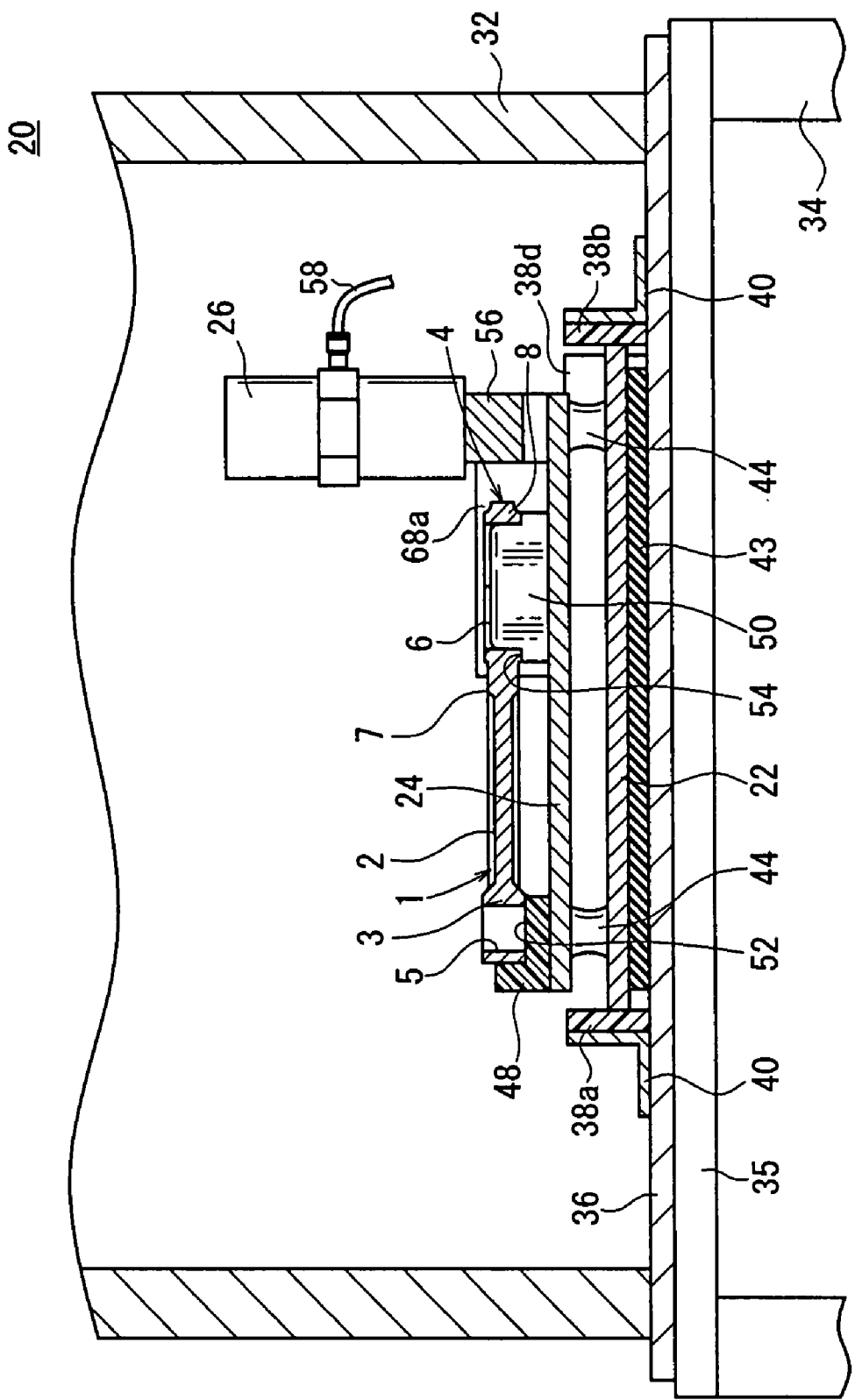
FIG. 5 is a partial, vertical sectional front view showing a fragment removing apparatus according to another embodiment of the present invention.

As shown in FIG. 5, the contact plate 30 may be removed from the fragment removing apparatus 20, in which case the fragments are dropped only by vibration of the air vibrator 26.

Figure 6:
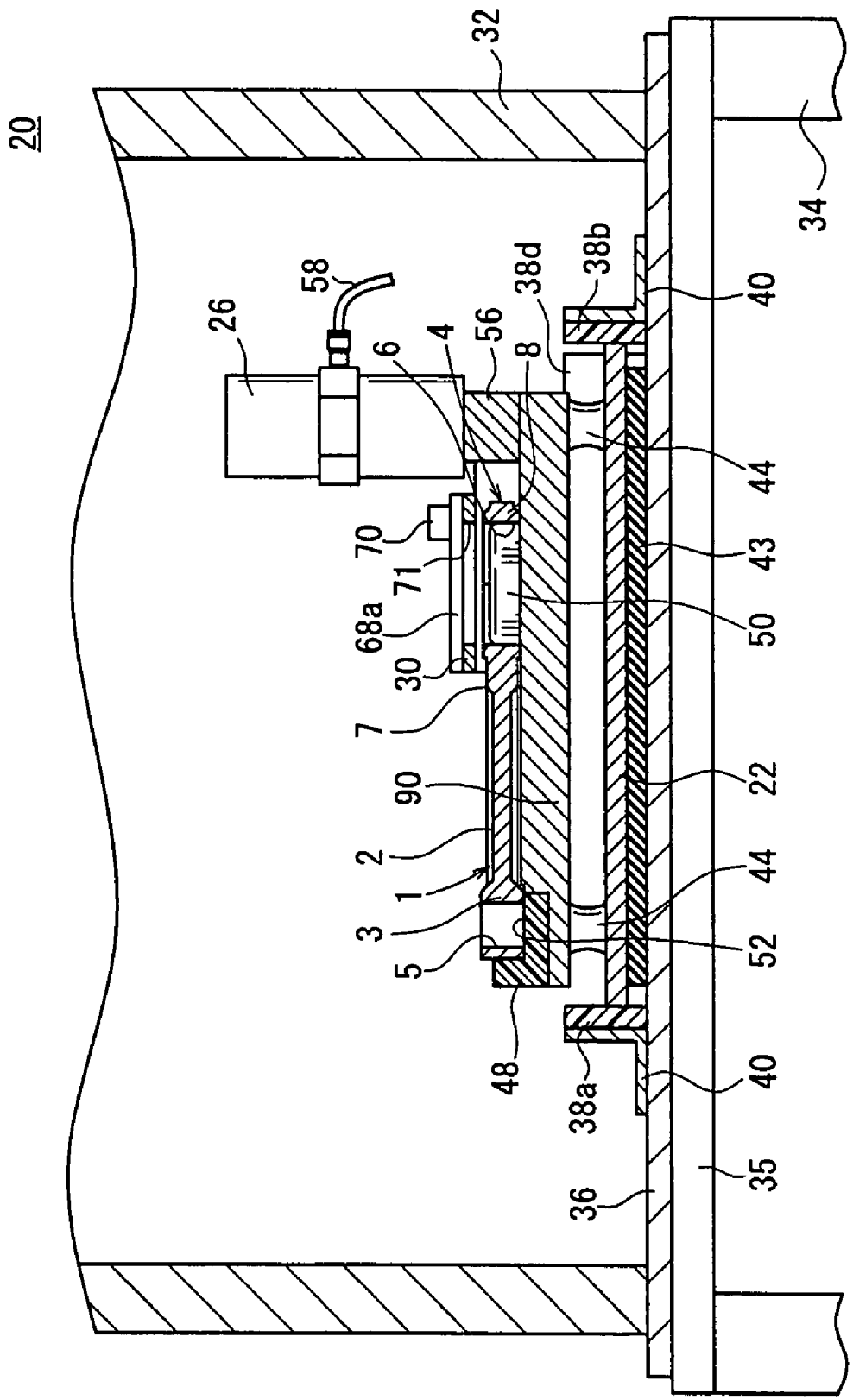
FIG. 6 is a partial, vertical sectional front view showing a fragment removing apparatus according to a further embodiment of the present invention.

As shown in FIG. 6, a mount 90, which is thicker than the mount 24, may be attached to the fragment removing apparatus 20, such that the larger end 6 is placed on the mount 90. In this case, it is not necessary to provide steps 54 on the holder 50. The upper surface of the mount 90 may be disposed in the same plane as a lower surface of the recess 52 of the vibration isolating holder 48.

Figure 7:
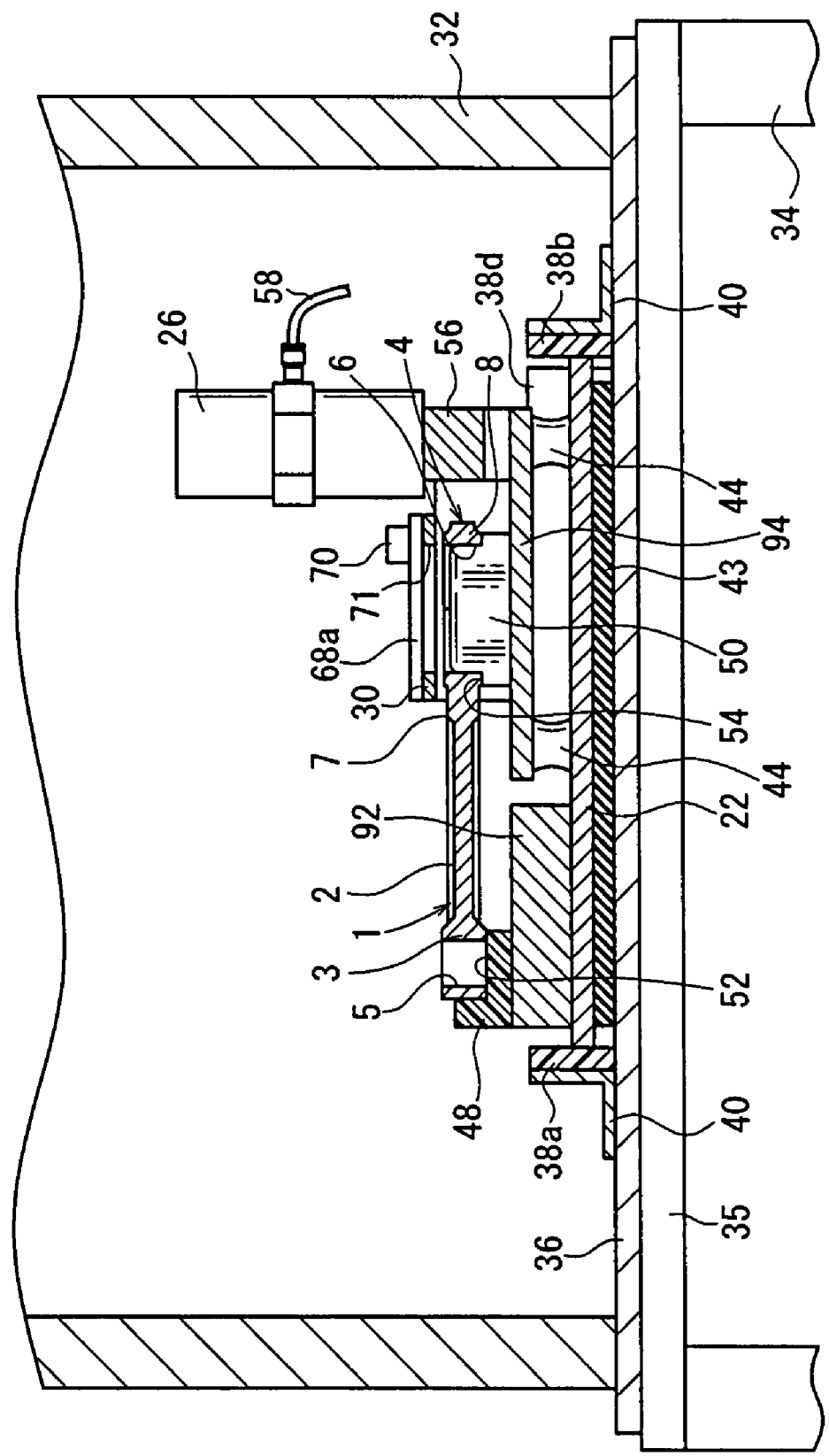
FIG. 7 is a partial, vertical sectional front view showing a fragment removing apparatus according to a still further embodiment of the present invention.

As shown in FIG. 7, a mount 92 may be provided for supporting the vibration isolating holder 48, together with a mount 94 for supporting the holder 50. In this case, the mount 92 may be disposed on the support 22 with the insulators 44 positioned therebetween.

In all the above-described embodiments, various gases such as nitrogen gas may be used instead of compressed air. The holder for supporting the smaller end 5 does not have to be composed of a vibration isolating material. The larger end 6 may be vibrated after the smaller end 5 has been positioned and fixed by a support member.

Figure 8:
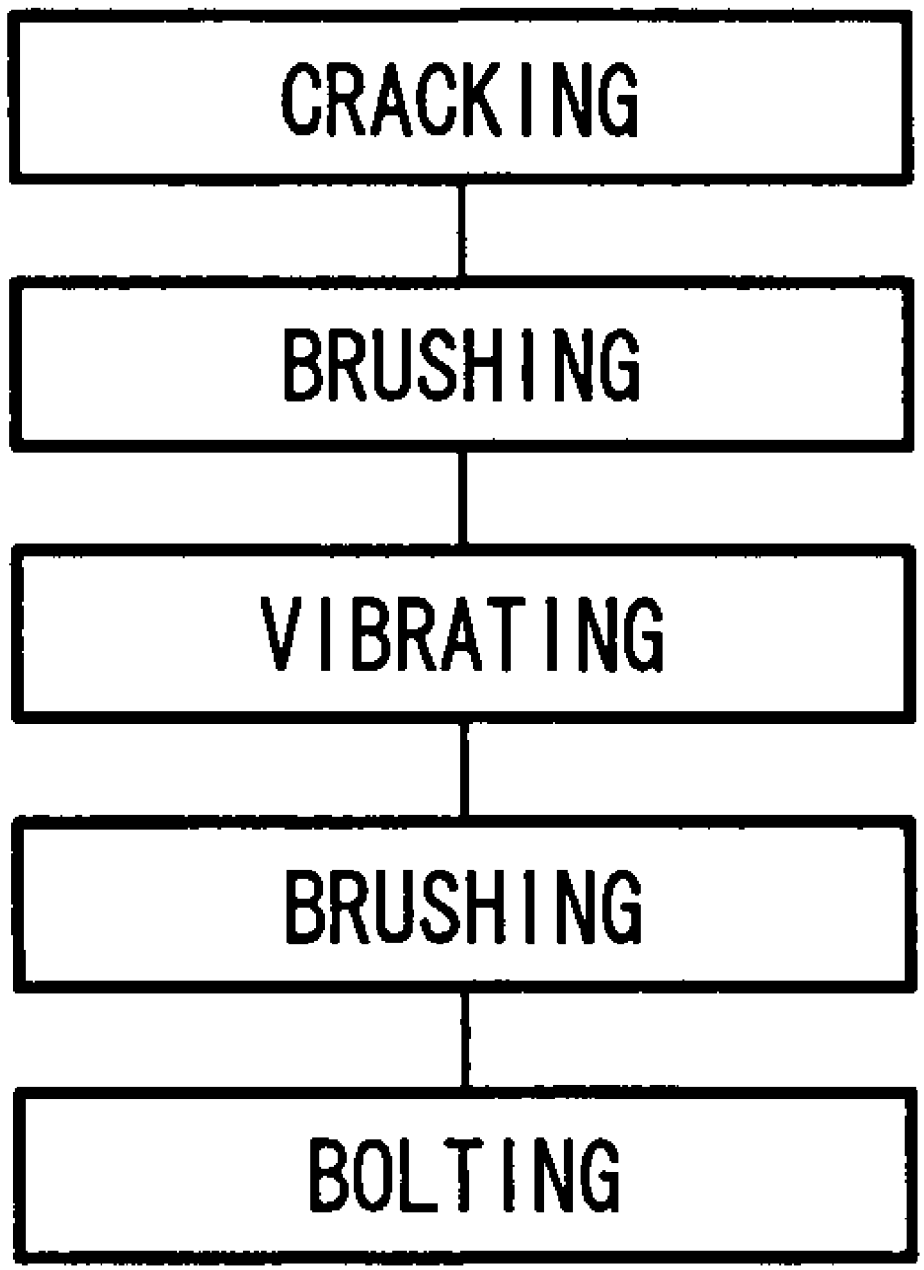
FIG. 8 is a flowchart of a fragment removing method according to yet another embodiment of the present invention.

As shown in the flowchart of FIG. 8, the cracked surfaces may also be brushed before performing the vibration step.

The collecting bag 64 is not limited to a transparent one.

Adhesive tape or an aspirator may be used instead of the brush as the eliminating means. When using an adhesive tape, the adhesive tape is applied to the cracked surfaces, whereby fragments become bonded onto the tape. In the case of using an aspirator, fragments are eliminated from the cracked surfaces by means of aspiration. Preferred examples of such aspirators may include vacuum pumps.

The invention claimed is:

1. A method of removing a fragment from a connecting rod obtained by forming a one-piece rod containing a shank, a smaller end provided at one end of said shank and having a first through hole, and a larger end wider than said smaller end provided at another end of said shank and having a second through hole larger than said first through hole, and cracking said larger end to form a rod body and a cap, the method comprising the steps of:

positioning said cracked connecting rod with a holder, while leaving a clearance between said rod body and said cap; and vibrating said holder, thereby vibrating only said larger end to cause said fragment to drop from said larger end;

wherein a contact plate is disposed above said larger end, and said larger end is vibrated such that said larger end comes into contact with said contact plate.

2. The method according to claim 1, further comprising a step of eliminating the fragment from cracked surfaces of said rod body and said cap by a fragment eliminating means, before performing said vibrating step.

3. The method according to claim 2, wherein said fragment eliminating means comprises a brush, adhesive tape, or an aspirator.

4. The method according to claim 1, wherein said holder is vibrated using a compressed gas.

5. A method of removing a fragment from a connecting rod obtained by forming a one-piece rod containing a shank, a smaller end provided at one end of said shank and having a first through hole, and a larger end wider than said smaller end provided at another end of said shank and having a second through hole larger than said first through hole, and cracking said larger end to form a rod body and a cap, the method comprising the steps of:

positioning said cracked connecting rod with a holder, while leaving a clearance between said rod body and said cap;

vibrating said holder, thereby vibrating only said larger end to cause said fragment to drop from said larger end, wherein a contact plate is disposed above said larger end, and said larger end is vibrated such that said larger end comes into contact with said contact plate; and further eliminating the fragment from cracked surfaces of said rod body and said cap, by a fragment eliminating means.

6. The method according to claim 5, further comprising the step of eliminating said a fragment from the cracked surfaces of said rod body and said cap by a fragment eliminating means, before performing said vibrating step.

7. The method according to claim 5, wherein said fragment eliminating means comprises a brush, adhesive tape, or an aspirator.

8. The method according to claim 5, wherein said holder is vibrated using a compressed gas.

9. An apparatus for removing a fragment from a connecting rod obtained by forming a one-piece rod containing a shank, a smaller end provided at one end of said shank and having a first through hole, and a larger end wider than said smaller end provided at another end of said shank and having a second through hole larger than said first through hole, the larger end being cracked to form a rod body and a cap, the apparatus comprising:
   a mount;
   a holder fixed onto said mount for positioning said cracked connecting rod;
   a vibration isolating leg member for supporting said mount; and
   a vibrating means fixed onto said mount for vibrating said holder;
   wherein a contact plate is disposed above said larger end, and said larger end is vibrated such that said larger end comes into contact with said contact plate.

10. The apparatus according to claim 9, wherein said contact plate is rotatable.

11. The apparatus according to claim 9, wherein said vibrating means comprises a means using a compressed gas.

12. The apparatus according to claim 9, further comprising a fragment-collecting unit for collecting a dropped fragment.

13. The apparatus according to claim 12, wherein said fragment-collecting unit comprises a collecting bag.

14. The apparatus according to claim 13, wherein said collecting bag is transparent.

15. The apparatus according to claim 9, wherein said apparatus is contained inside a casing.

* * * * *